(12) United States Patent
Kirupanantham et al.

(10) Patent No.: US 10,723,048 B2
(45) Date of Patent: Jul. 28, 2020

(54) METHOD FOR A POST PROCESS TREATMENT FOR MANUFACTURING AT LEAST A PART OF A MOLDED SPORTING GOOD

(71) Applicant: adidas AG, Herzogenaurach (DE)

(72) Inventors: Giridharan Kirupanantham, Fürth (DE); Christopher Edward Holmes, Veitsbronn (DE); Tru Huu Minh Le, Erlangen (DE)

(73) Assignee: adidas AG, Herzogenaurach (DE)

( * ) Notice: Subject to any disclaimer, the term of this patent is extended or adjusted under 35 U.S.C. 154(b) by 109 days.

(21) Appl. No.: 15/939,863

(22) Filed: Mar. 29, 2018

(65) Prior Publication Data

US 2018/0290349 A1  Oct. 11, 2018

(30) Foreign Application Priority Data

Apr. 5, 2017  (DE) .................. 10 2017 205 830

(51) Int. Cl.
*B29C 44/34* (2006.01)
*B29C 44/54* (2006.01)
(Continued)

(52) U.S. Cl.
CPC ............ *B29C 44/3461* (2013.01); *A43B 5/00* (2013.01); *A43B 13/02* (2013.01); *A43B 13/04* (2013.01);
(Continued)

(58) Field of Classification Search
CPC ............ B29C 44/3461; B29C 35/0085; B29C 44/445; B29C 2035/0861; B29K 2075/00
See application file for complete search history.

(56) References Cited

U.S. PATENT DOCUMENTS

| 1,855,098 A | 4/1932 | Collins |
| 3,315,317 A | 4/1967 | Winkler |
| (Continued) | | |

FOREIGN PATENT DOCUMENTS

| AT | 505333 A1 | 12/2008 |
| CN | 1087573 A | 6/1994 |
| (Continued) | | |

OTHER PUBLICATIONS

Office Action, Japanese Patent Application No. 2018-071971, dated Oct. 8, 2019, 9 pages.
(Continued)

*Primary Examiner* — Kara B Boyle
(74) *Attorney, Agent, or Firm* — Kilpatrick Townsend & Stockton LLP (57) ABSTRACT

The present invention is directed to methods for a post process treatment of a plurality of individual expanded particles for manufacturing at least a part of a molded sporting good, in particular a midsole of a shoe. Furthermore, it is directed to a sporting good and a sports shoe. The method for a post process treatment of a plurality of individual expanded particles for manufacturing at least a part of a molded sporting good, in particular a midsole of a shoe, may include the steps of providing a plurality of expanded particles of a particle foam and controlling a heat treatment to increase the density of the individual expanded particles.

14 Claims, 2 Drawing Sheets

(51) Int. Cl.
| | |
|---|---|
| *B29C 44/56* | (2006.01) |
| *B29K 19/00* | (2006.01) |
| *B29D 35/12* | (2010.01) |
| *B29C 44/44* | (2006.01) |
| *B29C 35/08* | (2006.01) |
| *A43B 13/04* | (2006.01) |
| *A43B 5/00* | (2006.01) |
| *A43B 13/18* | (2006.01) |
| *A43B 13/02* | (2006.01) |
| *B29D 35/14* | (2010.01) |
| *A63B 71/12* | (2006.01) |
| *B29K 75/00* | (2006.01) |

(52) U.S. Cl.
CPC ........ *A43B 13/187* (2013.01); *B29C 35/0805* (2013.01); *B29C 44/445* (2013.01); *B29D 35/122* (2013.01); *B29D 35/142* (2013.01); *A63B 71/1225* (2013.01); *A63B 2071/1258* (2013.01); *B29C 2035/0861* (2013.01); *B29K 2075/00* (2013.01)

(56) References Cited

U.S. PATENT DOCUMENTS

| | | | |
|---|---|---|---|
| 3,424,827 | A | 1/1969 | Galizia et al. |
| 3,813,201 | A | 5/1974 | Frederick et al. |
| 4,902,721 | A | 2/1990 | Pham et al. |
| 5,314,927 | A | 5/1994 | Kondo et al. |
| 5,518,060 | A | 5/1996 | Cleary et al. |
| 5,667,737 | A | 9/1997 | Wittmann |
| 5,736,167 | A | 4/1998 | Chang |
| 5,937,265 | A | 8/1999 | Pratt et al. |
| 6,432,320 | B1 | 8/2002 | Bonsignore et al. |
| 6,464,922 | B1 | 10/2002 | Bogdan |
| 6,800,227 | B1 | 10/2004 | Nohara et al. |
| D709,680 | S | 7/2014 | Herath |
| 8,958,901 | B2 | 2/2015 | Regan |
| D740,003 | S | 10/2015 | Herath |
| D740,004 | S | 10/2015 | Hoellmueller et al. |
| 9,212,270 | B2 | 12/2015 | Fuessi et al. |
| D758,056 | S | 6/2016 | Galway et al. |
| D776,410 | S | 1/2017 | Galway et al. |
| D783,264 | S | 4/2017 | Hoellmueller et al. |
| 9,610,746 | B2 | 4/2017 | Wardlaw et al. |
| 9,681,709 | B2 | 6/2017 | Manz et al. |
| 9,781,970 | B2 | 10/2017 | Wardlaw et al. |
| 9,781,974 | B2 | 10/2017 | Reinhardt et al. |
| 9,788,598 | B2 | 10/2017 | Reinhardt et al. |
| 9,788,606 | B2 | 10/2017 | Reinhardt et al. |
| 9,820,528 | B2 | 11/2017 | Reinhardt et al. |
| 9,849,645 | B2 | 12/2017 | Wardlaw et al. |
| 9,930,928 | B2 | 4/2018 | Whiteman et al. |
| 9,968,157 | B2 | 5/2018 | Wardlaw et al. |
| 10,039,342 | B2 | 8/2018 | Reinhardt et al. |
| D828,686 | S | 9/2018 | Hoellmueller et al. |
| D828,991 | S | 9/2018 | Herath |
| D840,137 | S | 2/2019 | Herath et al. |
| 10,259,183 | B2 | 4/2019 | Wardlaw et al. |
| D851,889 | S | 6/2019 | Dobson et al. |
| D852,475 | S | 7/2019 | Hoellmueller |
| D853,691 | S | 7/2019 | Coonrod et al. |
| D853,699 | S | 7/2019 | Coonrod et al. |
| 2001/0013459 | A1 | 8/2001 | Pattantyus-Abraham et al. |
| 2001/0048182 | A1 | 12/2001 | Caretta et al. |
| 2002/0170650 | A1 | 11/2002 | Chi |
| 2004/0032042 | A1 | 2/2004 | Chi |
| 2005/0110183 | A1 | 5/2005 | Buchel et al. |
| 2005/0144034 | A1 | 6/2005 | Hunter |
| 2006/0043645 | A1 | 3/2006 | Goettsch et al. |
| 2007/0029698 | A1 | 2/2007 | Rynerson et al. |
| 2008/0277837 | A1 | 11/2008 | Liu et al. |
| 2009/0013558 | A1 | 1/2009 | Hazenberg et al. |
| 2009/0072436 | A1 | 3/2009 | Dean |
| 2009/0142563 | A1* | 6/2009 | Zorn .................... B29C 44/105 428/219 |
| 2011/0232008 | A1 | 9/2011 | Crisp |
| 2012/0056345 | A1 | 3/2012 | Lee |
| 2013/0125319 | A1 | 5/2013 | Regan |
| 2013/0126075 | A1 | 5/2013 | Jiang |
| 2013/0150468 | A1 | 6/2013 | Fuessi et al. |
| 2013/0266792 | A1 | 10/2013 | Nohara et al. |
| 2013/0333950 | A1 | 12/2013 | Atkins et al. |
| 2014/0017450 | A1 | 1/2014 | Baghdadi et al. |
| 2014/0189964 | A1 | 7/2014 | Wen et al. |
| 2014/0223673 | A1* | 8/2014 | Wardlaw ............ B29D 35/0063 12/146 B |
| 2014/0227505 | A1 | 8/2014 | Schiller et al. |
| 2014/0243442 | A1* | 8/2014 | Coles .................... B29C 44/445 521/143 |
| 2014/0259753 | A1 | 9/2014 | Watkins et al. |
| 2014/0275306 | A1 | 9/2014 | Watkins et al. |
| 2015/0076236 | A1 | 3/2015 | Chen |
| 2015/0101133 | A1 | 4/2015 | Manz et al. |
| 2015/0119482 | A1 | 4/2015 | Kumar et al. |
| 2015/0166270 | A1 | 6/2015 | Buscher et al. |
| 2015/0174808 | A1 | 6/2015 | Rudolph et al. |
| 2015/0197617 | A1 | 7/2015 | Prissok et al. |
| 2015/0237823 | A1 | 8/2015 | Schmitt et al. |
| 2015/0344661 | A1 | 12/2015 | Spies et al. |
| 2015/0366289 | A1 | 12/2015 | Rustam et al. |
| 2016/0001476 | A1 | 1/2016 | Sommer et al. |
| 2016/0037859 | A1 | 2/2016 | Smith et al. |
| 2016/0046751 | A1 | 2/2016 | Spies et al. |
| 2016/0121524 | A1 | 5/2016 | Daeschlein et al. |
| 2016/0227876 | A1 | 8/2016 | Le et al. |
| 2016/0244583 | A1 | 8/2016 | Keppeler |
| 2016/0244584 | A1 | 8/2016 | Keppeler |
| 2016/0244587 | A1 | 8/2016 | Gutmann et al. |
| 2016/0278481 | A1 | 9/2016 | Le et al. |
| 2016/0295955 | A1 | 10/2016 | Wardlaw et al. |
| 2016/0302508 | A1 | 10/2016 | Kormann et al. |
| 2016/0311993 | A1 | 10/2016 | Zhang et al. |
| 2016/0346627 | A1 | 12/2016 | Le et al. |
| 2017/0253710 | A1 | 9/2017 | Smith et al. |
| 2017/0259474 | A1 | 9/2017 | Holmes et al. |
| 2017/0311650 | A1 | 11/2017 | Hupperets et al. |
| 2017/0340067 | A1 | 11/2017 | Dyckmans et al. |
| 2017/0341325 | A1 | 11/2017 | Le et al. |
| 2017/0341326 | A1 | 11/2017 | Holmes et al. |
| 2017/0341327 | A1 | 11/2017 | Le et al. |
| 2018/0000197 | A1 | 1/2018 | Wardlaw et al. |
| 2018/0035755 | A1 | 2/2018 | Reinhardt et al. |
| 2018/0093437 | A1 | 4/2018 | Wardlaw et al. |
| 2018/0154598 | A1 | 6/2018 | Kurtz et al. |
| 2018/0206591 | A1 | 7/2018 | Whiteman et al. |
| 2018/0235310 | A1 | 8/2018 | Wardlaw et al. |
| 2018/0303198 | A1 | 10/2018 | Reinhardt et al. |
| 2019/0021435 | A1 | 1/2019 | Kormann et al. |
| 2019/0291371 | A1 | 9/2019 | Wardlaw et al. |

FOREIGN PATENT DOCUMENTS

| | | |
|---|---|---|
| CN | 103978620 A | 8/2014 |
| CN | 105209233 A | 12/2015 |
| CN | 205021904 U | 2/2016 |
| CN | 105520278 A | 4/2016 |
| DE | 1729011 A1 | 6/1971 |
| DE | 3032246 | 4/1982 |
| DE | 3437786 A1 | 4/1986 |
| DE | 19633467 A1 | 2/1998 |
| DE | 19648804 A1 | 5/1998 |
| DE | 19654860 A1 | 5/1998 |
| DE | 19704700 C1 | 9/1998 |
| DE | 19860611 C1 | 3/2000 |
| DE | 102004049060 A1 | 6/2003 |
| DE | 102004028462 A1 | 12/2005 |
| DE | 202006009569 U1 | 6/2006 |
| DE | 202007006164 U1 | 9/2007 |
| DE | 102006024940 A1 | 12/2007 |
| DE | 102007054723 A1 | 5/2009 |
| DE | 102009030678 A1 | 4/2010 |
| DE | 102009004386 A1 | 7/2010 |

(56) References Cited

FOREIGN PATENT DOCUMENTS

| | | |
|---|---|---|
| DE | 202011109598 | 2/2012 |
| DE | 102013012515 A1 | 3/2014 |
| DE | 102013002519 A1 | 8/2014 |
| DE | 102013108053 A1 | 1/2015 |
| DE | 102013221018 A1 | 4/2015 |
| DE | 102013221020 A1 | 4/2015 |
| DE | 102014107847 A1 | 12/2015 |
| DE | 102015202013 A1 | 8/2016 |
| DE | 102015202014 A1 | 8/2016 |
| DE | 102015224885 A1 | 6/2017 |
| EP | 0790010 A1 | 8/1997 |
| EP | 0792593 A2 | 9/1997 |
| EP | 0976518 A2 | 2/2000 |
| EP | 1016354 A1 | 7/2000 |
| EP | 1259365 A1 | 11/2002 |
| EP | 1535714 A2 | 6/2005 |
| EP | 1990170 A2 | 11/2008 |
| EP | 2564719 A1 | 3/2013 |
| EP | 2649896 A2 | 10/2013 |
| EP | 2684665 A2 | 1/2014 |
| EP | 2764972 A1 | 8/2014 |
| EP | 2767181 A1 | 8/2014 |
| EP | 2786670 A1 | 10/2014 |
| EP | 2845504 A1 | 3/2015 |
| EP | 2862467 A1 | 4/2015 |
| EP | 2865289 A1 | 4/2015 |
| EP | 2984956 A1 | 2/2016 |
| EP | 2649896 A2 | 10/2016 |
| EP | 2767183 B1 | 4/2017 |
| GB | 1063353 A | 3/1967 |
| GB | 1275095 A | 5/1972 |
| GB | 1439101 A | 6/1976 |
| JP | S48-045560 | 6/1973 |
| JP | S48-042216 | 12/1973 |
| JP | S49-020266 | 5/1974 |
| JP | S50-155569 A | 12/1975 |
| JP | 54114354 | 9/1979 |
| JP | 55129004 | 10/1980 |
| JP | 5620402 | 2/1981 |
| JP | S57-005009 U | 1/1982 |
| JP | 57180653 | 11/1982 |
| JP | 5821304 | 2/1983 |
| JP | S58-142828 | 8/1983 |
| JP | S60-500491 | 4/1985 |
| JP | 6141402 | 2/1986 |
| JP | 6374629 | 4/1988 |
| JP | 6046483 | 6/1994 |
| JP | H08-131209 A | 5/1996 |
| JP | 08239570 | 9/1996 |
| JP | 3047622 U | 9/1997 |
| JP | H09-322803 A | 12/1997 |
| JP | 11129275 | 5/1999 |
| JP | 11291275 | 10/1999 |
| JP | 2000-037208 A | 2/2000 |
| JP | 2000-190394 A | 7/2000 |
| JP | 2000-279205 A | 10/2000 |
| JP | 2002-119302 A | 4/2002 |
| JP | 2002-144366 A | 5/2002 |
| JP | 2003-135105 A | 5/2003 |
| JP | 2003-310302 A | 11/2003 |
| JP | 2006-137032 A | 6/2006 |
| JP | 2007-504977 A | 3/2007 |
| JP | 2008-544009 A | 12/2008 |
| JP | 2009-518495 A | 5/2009 |
| JP | 2014-158708 | 9/2014 |
| JP | 2014-531352 A | 11/2014 |
| WO | 94/20568 | 9/1994 |
| WO | 99/55186 A1 | 11/1999 |
| WO | 2005/026243 A1 | 3/2005 |
| WO | 2005/066250 A1 | 7/2005 |
| WO | 2007/082838 A1 | 7/2007 |
| WO | 2008/087078 A | 7/2008 |
| WO | 2009/036240 A1 | 3/2009 |
| WO | 2009/146368 A1 | 12/2009 |
| WO | 2010/136398 A1 | 12/2010 |
| WO | 2011/125540 A1 | 10/2011 |
| WO | 2011/134996 A1 | 11/2011 |
| WO | 2014/046940 A1 | 3/2014 |
| WO | 2014/150122 A2 | 9/2014 |
| WO | 2015/052265 A1 | 4/2015 |
| WO | 2015/052267 A1 | 4/2015 |
| WO | 2015/075546 A1 | 5/2015 |

OTHER PUBLICATIONS

"Plastic", Britannica Online Encyclopedia, Available Online at: https://www.britannica.com/print/article/463684, Accessed from Internet on Aug. 17, 2016, 15 pages.
Extended European Search Report, European Patent Application No. 18165075.5, dated Sep. 17, 2018, 7 pages.
Office Action, Chinese Patent Application No. 201810298194.6, dated Nov. 19, 2019.
Office Action, German Patent Application No. 102017205830.7, dated Nov. 15, 2017, 8 pages.
U.S. Appl. No. 29/664,097, filed Sep. 21, 2018, Unpublished.
U.S. Appl. No. 16/680,852, filed Nov. 12, 2019, Unpublished.
U.S. Appl. No. 62/137,139, filed Mar. 23, 2015, Unpublished.
U.S. Appl. No. 16/025,248, filed Jul. 2, 2018, Unpublished.
U.S. Appl. No. 29/663,342, filed Sep. 13, 2018, Unpublished.
U.S. Appl. No. 29/595,857, filed Mar. 2, 2017, Unpublished.
U.S. Appl. No. 29/691,166, filed May 14, 2019, Unpublished.
U.S. Appl. No. 29/643,233, filed Apr. 5, 2018, Unpublished.
U.S. Appl. No. 29/592,935, filed Feb. 3, 2017, Unpublished.
U.S. Appl. No. 29/641,371, filed Mar. 21, 2018, Unpublished.
U.S. Appl. No. 29/663,029, filed Sep. 11, 2018, Unpublished.
U.S. Appl. No. 29/641,256, filed Mar. 20, 2018, Unpublished.
U.S. Appl. No. 29/641,223, filed Mar. 20, 2018, Unpublished.
U.S. Appl. No. 29/614,532, filed Aug. 21, 2017, Unpublished.
U.S. Appl. No. 29/697,489, filed Jul. 9, 2019, Unpublished.
U.S. Appl. No. 29/691,854, filed May 20, 2019, Unpublished.
U.S. Appl. No. 29/679,962, filed Feb. 12, 2019, Unpublished.
U.S. Appl. No. 29/693,455, filed Jun. 3, 2019, Unpublished.
U.S. Appl. No. 16/465,485, filed May 30, 2019, Unpublished.

* cited by examiner

METHOD FOR A POST PROCESS TREATMENT FOR MANUFACTURING AT LEAST A PART OF A MOLDED SPORTING GOOD

CROSS REFERENCE TO RELATED APPLICATION

This application is related to and claims priority benefits from German Patent Application No. DE 10 2017 205 830.7, filed on Apr. 5, 2017, entitled Method for a Post process treatment of a plurality of individual expanded particles for manufacturing at least a part of a molded sporting good, sporting good and sports shoe ("the '830 application"). The '830 application is hereby incorporated herein in its entirety by this reference.

FIELD OF THE INVENTION

The present invention is directed to methods for a post process treatment of a plurality of individual expanded particles for manufacturing at least a part of a molded sporting good, in particular a midsole of a shoe. Furthermore, it is directed to a sporting good and a sports shoe.

BACKGROUND

Shoes soles, in particular midsoles, play an important role in the construction of shoes. They protect the wearer's foot against injuries caused for example by sharp objects. In addition, a shoe sole may provide cushioning to cushion the forces which occur when the shoe contacts the ground. In order to provide such a plurality of functionalities, shoe soles, in particular shoe soles for sports shoes, are usually manufactured by molding and foaming polymers. Some examples of common foam materials for shoe soles are, ethylene-vinyl acetate (EVA), and thermoplastic polyurethane (TPU).

In recent times, the demand for improved performance properties in shoe soles has increased, in particular in shoe soles for sports shoes. The demand for increased performance has led to the need for improved materials, new materials and new processing methods to meet the performance requirements.

In one approach, individual expanded particles or the like are filled into a cavity and molded. For example, applicant disclosed in EP 2 786 670 A1 and EP 2 649 896 A1 methods for manufacturing cushioning elements as well as shoe soles comprising a plurality of expanded TPU particles.

However, a common disadvantage of these manufacturing methods is that they are very complicated and in particular not easily adapted to provide a shoe sole with a plurality of functionalities according to customers' needs and requirements. For example, in the shoe soles of the described applications, EP 2 786 670 A1 and EP 2 649 896 A1, the particles are fused at their outer surfaces through the application of heat. However, it is difficult to provide different cushioning properties in different parts of the shoe sole. It is possible that different cushioning properties could be provided by using particles having different base properties and composition, for example, through adjusting the base recipe via altering the chemical composition of the particles, for example, by altering the base polymer. However, the use of different particles may cause difficulties in the logistics of the supply chain, the storage of the particles, and/or delivery of the particles to the production steps at the correct time, quantity and location during the mass production of shoe soles.

Therefore, the underlying problem of the present invention is to provide an improved method for manufacturing at least a part of a molded sporting good, in particular a sole for a shoe from individual expanded particles, which is capable to at least partly overcome some of the above mentioned deficiencies of the prior art.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for a post treatment of a plurality of individual expanded particles for manufacturing at least a part of a molded sporting good comprises: a. providing a plurality of individual expanded particles of a particle foam; and b. controlling a heat treatment to increase the density of the individual expanded particles.

In certain embodiments, the increase of the density of the individual expanded particles comprises shrinking the size of the individual expanded particles.

In certain embodiments, the density may increase by more than 100%. In certain embodiments, the density may increase from 30 to 70%

The heat treatment comprises annealing the individual expanded particles at a temperature below the onset of melting the particles.

In certain embodiments, the heat treatment comprises annealing the individual expanded particles at a temperature from 0 to 50° C. below the onset of melting the particles.

The heat treatment may be carried out for a duration of 0.1 minutes to 60 minutes.

The method may further comprise the step of cooling the individual expanded particles with the increased density.

The cooling step may further comprise allowing the individual expanded particles to cool to ambient temperature. In certain embodiments, the individual expanded particles are actively cooled.

The method may further comprise the step of molding at least a part of the sporting good, comprising the individual expanded particles with the increased density. In certain embodiments, the step of molding at least a part of the sporting good comprises molding at least two sets of individual expanded particles having different densities.

Step b. may comprise applying radio frequency to the plurality of individual expanded particles.

In certain embodiments, the individual expanded particles comprise expanded thermoplastic polyurethane, eTPU.

According to certain embodiments, a sporting good is molded at least in part from a plurality of individual expanded particles, wherein the individual expanded particles comprise an increased density due to a controlled heat treatment as a post process after expanding the particles.

The sporting good may be at least in part molded from at least two sets of individual expanded particles having different densities.

In certain embodiments, the sporting good is a sports shoe.

The individual expanded particles may be comprised in a sole of the sports shoe.

In certain embodiments, the individual expanded particles have been subjected to a post process treatment comprising: a. providing a plurality of individual expanded particles of a particle foam; and b. controlling a heat treatment to increase the density of the individual expanded particles.

BRIEF DESCRIPTION OF THE DRAWINGS

In the following detailed description, embodiments of the invention are described referring to the following figures.

BRIEF DESCRIPTION

This problem is at least partly solved by a method according to claim 1. In some embodiments, the method for a post process treatment of a plurality of individual expanded particles for manufacturing at least a part of a molded sporting good, in particular a midsole of a shoe, comprises the steps of: (a.) providing a plurality of individual expanded particles of a particle foam and (b.) controlling a heat treatment to increase the density of the individual expanded particles.

The inventors have found out that a controlled heat treatment of the individual expanded particles, for example, TPU, polyamide (PA) or polyether block amide (PEBA) based particles, may affect the internal stresses present in a particle. These stresses may be created during expanded particle creation, for example, during processing of the particle. One such exemplary example would be the stresses created during solid state expansion of an expanded foam particle. In some embodiments, other suitable processing methods where stresses may be imparted to the particle may be used. The heat treatment affects the internal stresses inside the individual expanded particles leading to an increase in their density.

The heat and/or duration of the heat treatment may be varied to achieve different density increases.

Therefore, the present invention allows to selectively adjust the density of the individual expanded particles prior to molding or during molding. As a result, a wide range of different densities of the individual expanded particles may be obtained as an inline production step and without the need for supply and storage of different types of expanded particles. In this context, it has to be understood that the production or manufacturing steps may be at least partly performed in a same facility, e.g. the heat treatment step may be next to the molding step or in another area of the same facility, or, alternatively, the heat treatment step may be performed in another facility and transported later to the facility for molding the sporting good.

Individual expanded particles made from expanded thermoplastic polyurethane (eTPU) are known in particular from WO 2008/087078 A1, WO 2007/082838 A1, WO 2010/136398 A1 and WO 2005/066250 A1. Moreover, individual expanded particles made from expanded polyether block amide (ePEBA) are known from DE 10 2014 216 992 A1.

In some embodiments, the increase of the density of the individual expanded particles may comprise shrinking the size of the individual expanded particles. Moreover, the density may increase by more than 300%, may further increase by more than 200%, may further increase by more than 100%, or may further increase in the range of 30% to 70%.

In some embodiments, the heat treatment comprises annealing the individual expanded particles at a temperature below the onset of melting the particles, comprises annealing at a temperature in the range from 0-50° C. below the onset of melting of the particles, may further comprise annealing at a temperature in the range from 0-30° C. below the onset of melting of the particles, may further comprise annealing at a temperature y in the range from 0-10° C. below the onset of melting of the particles, may further comprise annealing at a temperature in the range from 0-5° C. below the onset of melting of the particles. It will be apparent to the person skilled in the art that the onset of melting will vary from material to material, for example, between eTPU and ePEBA or ePA. This aspect of the present invention may further improve the whole manufacturing process as the increased density of the individual expanded particles may be obtained before fusing the particles together to form a final component. Moreover, annealing is a well-known process and easy to handle so that the whole manufacturing process may be further simplified.

In some embodiments, the heat treatment may be carried out for a duration of 0.1 minutes to 60 minutes, may further be carried out for a duration of 1 min to 60 min, may further be carried out for a duration of 5 min to 60 min, may further be carried out for a duration of 5 min to 30 min, may further be carried out for a duration of 10 min to 25 min. It will be apparent that there is a relationship between the duration of the heat treatment and the temperature at which the heat treatment is carried out and combinations thereof are possible. In some cases, it may be possible to achieve the same or similar results for the density change when utilizing a different combination of parameters. For example, a heat treatment of 5° C. below the onset of melting for 25 minutes compared with a heat treatment of 0° C. below the onset of melting for 10 minutes. It will be apparent to the person skilled in the art that these numbers are exemplary only.

In some embodiments, the method may further comprise the step of cooling the individual expanded particles with the increased density.

The cooling step may further comprise allowing the individual expanded particles to cool to ambient temperature. It has to be noted that the ambient temperature may depend on the location of the manufacturing. For example, the ambient temperature in parts of Asia is significantly higher than in parts of Europe.

Furthermore, cooling of the individual expanded particles may be active or passive. Passive cooling, in the context of this application, has the meaning of allowing the particles to cool without any external cooling means and return to ambient temperature. Active cooling, in the context of this application, has the meaning of applying external cooling means to the particles to affect the cooling step. It will be apparent to the skilled person, that there is a relationship between the duration of the cooling treatment and the rate at which the cooling is applied which the skilled person will chose to suit their intended onward production steps.

In some embodiments, the method may further comprise the step of molding at least a part of the sporting good, in particular a midsole for a shoe, comprising the individual expanded particles with the increased density. Moreover, the step of molding at least a part of the sporting good, in particular a midsole for a shoe, may comprise molding at least two sets of individual expanded particles having different densities.

Again, it should be noted that the heat treatment step to increase the density of the individual expanded particles may be performed in the same facility as the molding step. Alternatively, in some embodiments, the heat treatment step may also be performed in another facility than the molding step and the individual expanded particles with the increased density may be transported later to the facility for molding the sporting good as mentioned above.

In some embodiments, it is also possible that the heat treatment step may be performed in a mold that is also used for the molding step of at least a part of the sporting good. For example, a mold with a variable size may be used so that the individual expanded particles are filled into to this mold and the heat treatment may be performed. After increasing the density of the individual expanded particles, the size of the mold may be modified so that at least a part of the sporting good may be molded from the particles having an increased density. Of course, in some embodiments, the mold's size is fixed in both steps. However, even if a single mold is used for both, the heat treatment and the subsequent molding, they are still two independent process steps and not to be confused with a possible further shrinkage of the whole object during the subsequent molding step.

In some embodiments, step b. may comprise applying radio frequency to the plurality of individual expanded particles, i.e. electromagnetic radiation with a frequency in the range from 30 kHz-300 MHz. An advantage of using radio frequency is that it is easy to produce and easy to provide to the surfaces of the individual expanded particles. The amount of energy provided to the surfaces of the individual expanded particles by radio frequency may, for example, be controlled by adjusting the output power of the source, the intensity of the radiation, the size or emitted wavelength of the sources of the radio frequency, the distances of the sources to the surfaces, the view factor of the surfaces, i.e. how much of the emitted energy the surfaces intercepts, or the emissivity of the individual expanded particles material, etc. Moreover, the use of radio frequency does not impose any particular requirements, such as electrical conductivity, on the material of the surfaces of the individual expanded particles.

In some embodiments, the individual expanded particles may comprise expanded thermoplastic polyurethane, eTPU. Such particles provide excellent cushioning properties. Furthermore, eTPU is an elastomer, which is shape-stable, deforming under tensile and compressive stress, but returning largely to its original shape in the stress-free state. Thus, eTPU is very well suited to making shoe soles for sports shoes subjected to considerable loads.

According to a further aspect, the present invention relates to a sporting good molded at least in part from a plurality of individual expanded particles, wherein the individual expanded particles comprise an increased density due to a controlled heat treatment as a post process after expanding the particles. Moreover, the sporting good may be at least in part molded from at least two sets of individual expanded particles having different densities. Furthermore, the sporting good may be a sports shoe, wherein the individual expanded particles are comprised in a sole, in particular in a midsole, of the sports shoe or may be a shin guard. Moreover, the individual expanded particles may have been subjected to a post process treatment of one of the methods described above.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments and variations of the present invention are described in the following with particular reference to a post process treatment of a plurality of individual expanded particles for manufacturing at least a part of a molded sporting good, in particular a midsole for a shoe. However, the concept of the present invention may identically or similarly be applied to any sporting goods wherein at least a part of the sporting good is molded from individual expanded particles, for example, a tennis racket, golf club, baseball bat, badminton racket, cricket bat, ice-hockey stick, hockey stick, squash racket, table-tennis bat, shin guards, etc. Moreover, other type of shoes like casual shoes, boots such as working boots may be manufactured with parts, in particular soles, based on the present invention. Finally, the concept of the present invention may also identically or similarly be applied to any other type object wherein at least a part of the object is molded from individual expanded particles. In some embodiments, examples are components in the automotive industry like dashboards, insulating or cushioning materials for building construction or surfaces for playgrounds, athletics tracks, playing fields and sports halls.

It is also to be noted that individual embodiments of the invention are described in greater detail below. However, it will be clear to the person skilled in the art that the constructional possibilities and optional features described in relation to these specific embodiments may be further modified and combined with one another in a different manner within the scope of the present invention and that individual steps or features can also be omitted where they appear to be unnecessary to the skilled person. In order to avoid redundancies, reference is made to the explanations in the previous sections, which also apply to the embodiments of the following detailed description.

Figure 1A:
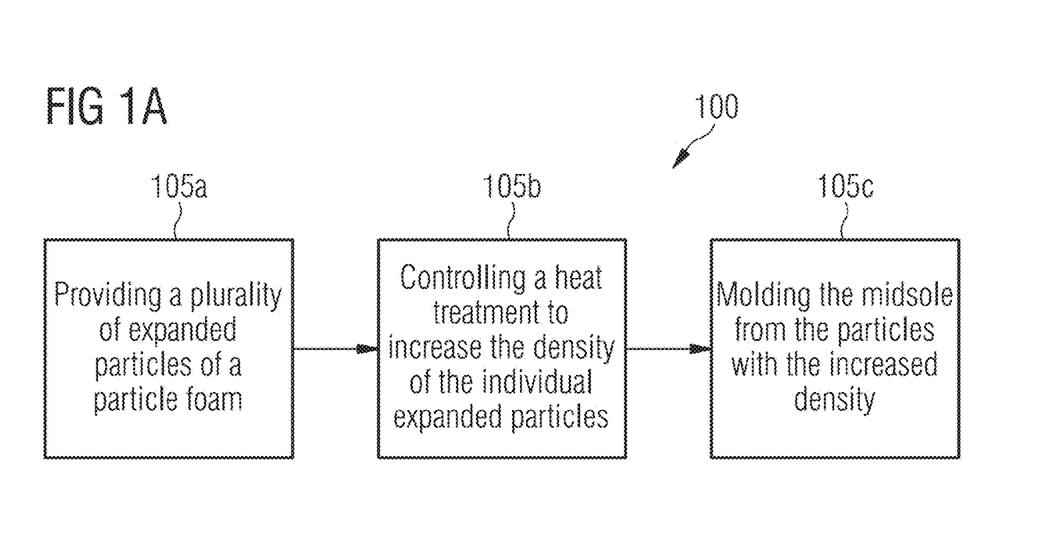
FIGS. 1a-b are schematic views of various embodiments of a system for a post process treatment of a plurality of individual expanded particles for manufacturing at least a part of a molded sporting good, in particular a midsole of a shoe, according to certain embodiments of the present invention.
Figure 1B:
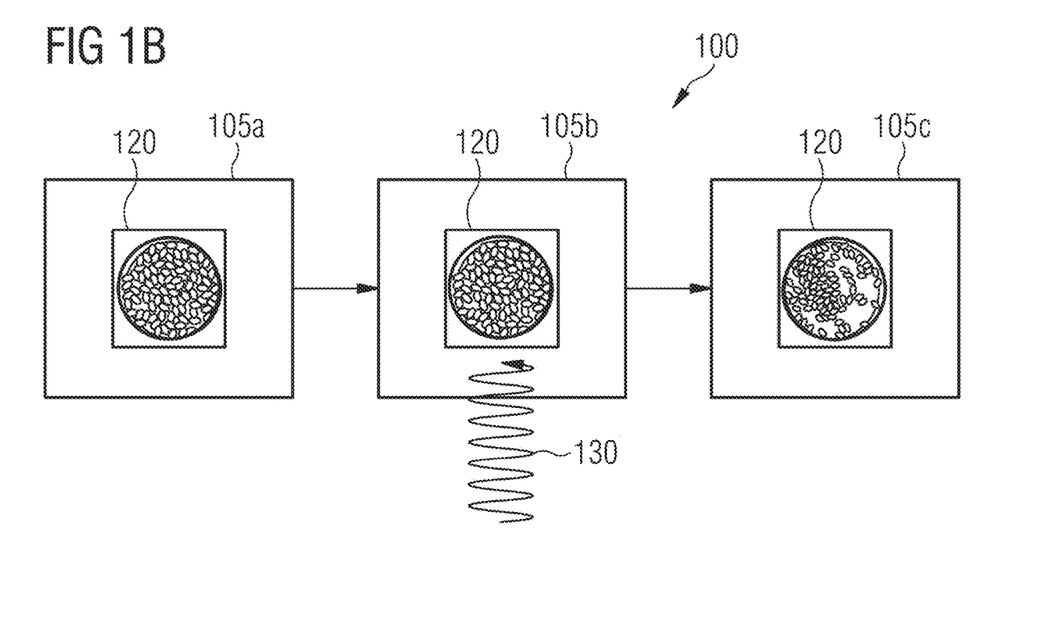

FIGS. 1*a-b* present schematic views of embodiments of the present invention for a system 100 for a post process treatment of a plurality of individual expanded particles for manufacturing at least a part of a molded sporting good, in particular a midsole of a shoe. The system 100 may be adapted to fully or partly perform at least one of the aforementioned methods, in particular the sequence of method steps: providing a plurality of individual expanded particles 120 of a particle foam; controlling a heat treatment to increase the density of the individual expanded particles 120 and molding the midsole from the individual expanded particles 120 with the increased density. It is noted that this sequence may be performed at different stations 105a, 105b and 105c of the system 100. Moreover, it is also noted that the representations of the stations are schematic, such that the dimensions shown in FIGS. 1a-b do not necessarily match the actual dimensions in a real-life application of the method. Rather, FIGS. 1a-b serve the purpose of indicating to the skilled person the scope of the present invention including potential design options and modifications of the method, as well as the different possibility to adapt the method according to a given set of requirements. Moreover, while the system 100 is preferably fully automatic, human intervention to perform some or even all of the method steps is not excluded. In the following, the step of controlling a heat treatment to increase the density of the individual expanded particles 120 is further described.

According to some embodiments of the invention, the density of the individual expanded particles 120 may be increased prior to or during molding by a controlled heat treatment, e.g. by applying heat energy 130 in a controlled manner. The term "controlled" in the context of the present invention refers to using a predetermined time and/or a predetermined temperature profile of the heat treatment as mentioned above. Moreover, the heat treatment step may be performed in the same facility as the molding step, e.g., next to the working station 105c for molding or in another area of the same facility, or, alternatively, in another facility and transported later to the facility for molding the sporting good.

As may be seen schematically in the embodiment of FIG. 1b, system 100 may further perform the steps of controlling the heat treatment to increase the density of the plurality of individual expanded particles 120 and molding the midsole from the plurality of individual expanded particles 120. The step of molding may be performed in a mold. For example, the mold may comprise a top part and a bottom part which may be movable relative to one another. Furthermore, the mold may have a variable size so that the heat treatment step to increase the density may be performed in the same mold as the molding step, for example as a preparatory step before molding. The mold parts form a cavity having a shape corresponding roughly to the midsole that is to be molded. Moreover, the particles 120 may be randomly arranged. However, the particles 120 or at least some of the particles 120 may also be aligned to each other or be otherwise intentionally arranged within the mold. Also, the mold may be adapted to provide a pre-molding heating only in certain parts thereof to obtain finally an object made from particles with some embodiments embodiment, the mold parts may be manufactured by an additive manufacturing method. Additive manufacturing can create very fine structures that cannot be obtained by traditional mold production techniques, or which are at least difficult or costly to produce. One advantage is therefore that the mass of the mold parts may be significantly reduced without endangering the mold's stability during the molding process. As a consequence, a lower heat capacity of the mold parts may be obtained. This in turn reduces the loss of energy, when heating the mold parts and also leads to a faster cooling process as the reduced heat capacity will accelerate the cooling of the mold parts at the end of the process cycle.

In some embodiments, the step of controlling the heat treatment to increase the density of the individual expanded particles 120 prior to molding or during molding may comprise applying radio frequency to the plurality of individual expanded particles 120. Herein, the radio frequency, i.e. radiation with a frequency in the range from 30 kHz to 300 MHz, may, for example, be supplied in the form of energy of electromagnetic radiation and may be emitted from a radiation source.

It is further possible that the energy is supplied in the form of radiation in a frequency range different from this frequency range. As specific examples, the energy may be supplied in the form of infrared (IR) radiation. The use of ultraviolet (UV) radiation may also be considered as well as radiation in the microwave range, i.e. radiation with a frequency in the range from 300 MHz to 300 GHz.

In some embodiments, the use of electromagnetic induction may also be considered. Electromagnetic induction describes the creation of an electric field by means of a temporal variation of the magnetic flux. Hence, also in the case of electromagnetic induction, energy is supplied in the form of a temporally varying electromagnetic field. Electromagnetic induction may in particular be used to fuse the particle surfaces, if the particles or their surfaces comprise a material or are coated with a material which comprises a certain electric conductivity. Then, the electric field created by the electromagnetic induction can create currents in this material, which heat up the particle surfaces. This may allow the selective and locally focused supply of energy for the controlled heat treatment. Hence, the degree of controlling the density of individual expanded particles as well as the fusing of the particles at their surfaces may be influenced and controlled very precisely, also for particles arranged within the interior of the plastic component.

Whether the use of radiation in the microwave range, radiation in the radiofrequency range, or electromagnetic induction is more beneficial may, for example, depend on the material from which the mold is made. One chooses the option in which the mold absorbs the smallest possible amount of energy from the used electromagnetic field(s). It is, of course, also possible that combinations of the above mentioned options are used.

Furthermore, the step of controlling the heat treatment to increase the density of the individual expanded particles 120 prior to molding or during molding may comprise applying heat energy 130 to a first set of individual expanded particles 120 and applying heat energy to a second set of individual expanded particles 120 (not shown in FIG. 1b), wherein the amounts of heat energy applied to the two sets may be different. This is achieved in that the first set which may be arranged in a first mold of two mold parts is treated with heat energy with a frequency f1 and the second set which may be arranged in a second mold of two mold parts (not shown in the figures) is treated with heat energy having another frequency, wherein the frequency f1 is different, e.g. higher than the other frequency. As a result, the heat energy 130 may "transport" more energy to the first set than the other heat energy may transport to the second set and the two sets of individual expanded particles may have different densities. In some embodiments, only one set, for example, the above mentioned second set, of individual expanded particles may be treated by heat. Alternatively, both frequencies may, for example, be chosen from the above mentioned frequency ranges (radio waves, microwaves, infrared, UV) or from at least one different frequency range.

Figure 2A:
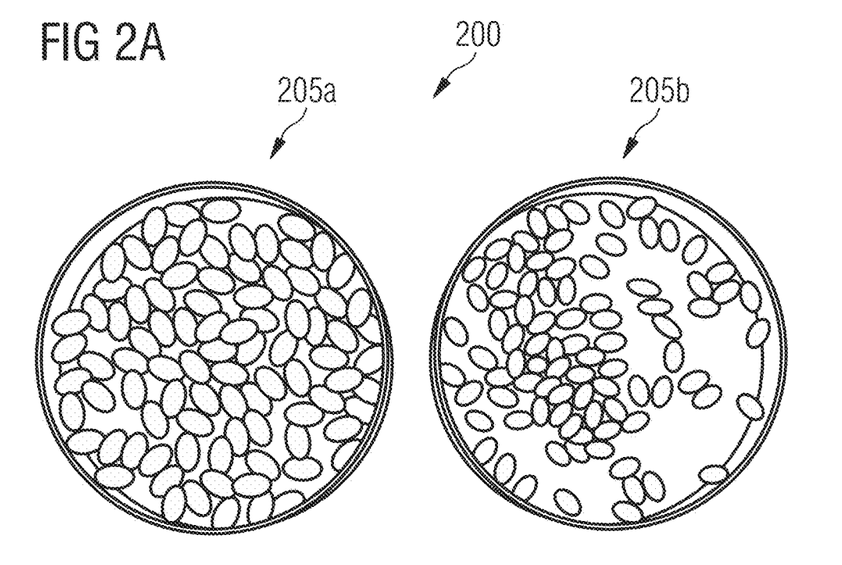
FIGS. 2a-b are pictures of individual expanded particles, according to certain embodiments of the present invention.
Figure 2B:
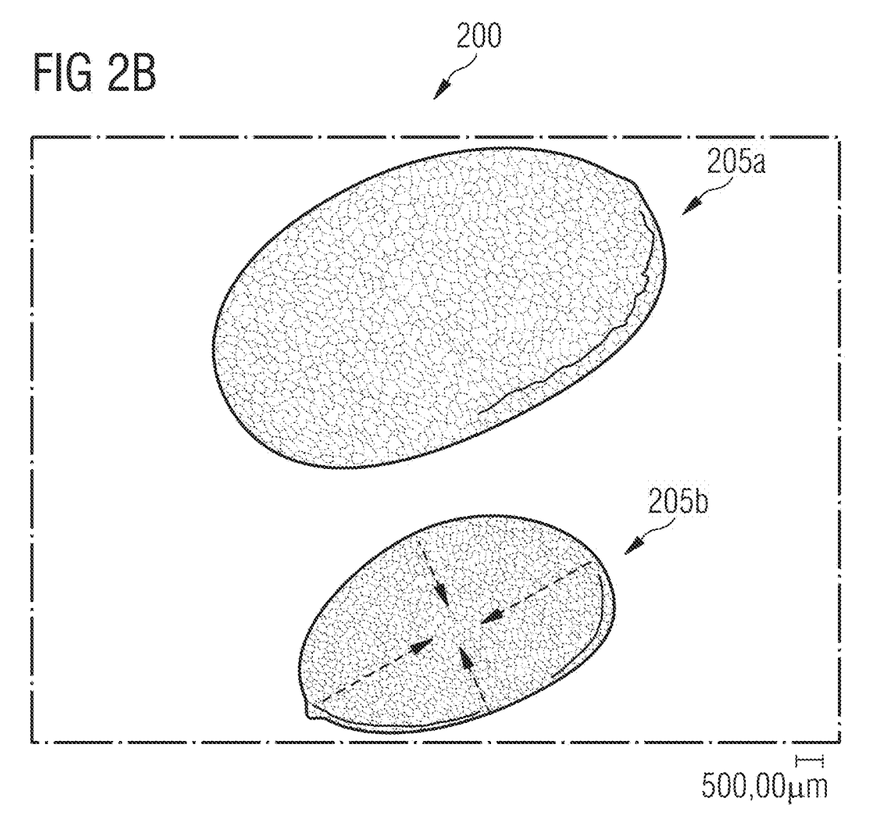

FIGS. 2a-b present pictures of exemplary individual expanded particles 200, e.g. similar to individual expanded particles 120, during the step of controlling the heat treatment to increase their density according to the present invention. The term "density" in the context of the present invention refers to the volumetric mass density of each of the individual expanded particles, i.e. its mass per unit volume, and not to the bulk density of the expanded particles. The picture in FIG. 2a is taken before and after the heat treatment which comprises applying heat energy in a convection oven to the individual expanded particles 200. Moreover, the particles comprise expanded thermoplastic polyurethane, eTPU.

The picture as shown in FIG. 2a presents a plurality of the individual expanded particles 200 in top view before and after the heat treatment. The individual expanded particles 200 in the embodiment 205a are not treated with heat and the individual expanded particles 200 in the embodiment 205b having an increased density are after the heat treatment.

As may be seen in FIG. 2b, the embodiment 205a shows one of the individual expanded particles 200 before the heat treatment. The controlled heat treatment, which may comprise annealing the individual expanded particle at a temperature below the onset of melting the particle, preferably in the range from 0-50° C. below the onset of melting of the particles preferably in the range from 0-30° C. below the onset of melting of the particle, preferably in the range from 0-10° C. below the onset of melting of the particle, more preferably in the range from 0-5° C. below the onset of melting of the particles, starts after a time point to =0 minutes, wherein the applied heat stays constant. The embodiment 205b shows the expanded particle after the heat treatment at the time point ti, for example after 10 minutes, wherein a shrinkage of the expanded particle occurs in a uniform manner (as indicated by the dashed arrows in embodiment 205b) so that its mass per unit volume is increased and consequently the density of the expanded particle is increased. Therefore, the controlled heat treatment allows to increase the density of the individual expanded particle, i.e. after it has been expanded. In some embodiments, the onset of melting of the particle may be in a different temperature range than that which is expected for the material class, if, for example, the onset of melting temperature is moved by agitating the expanded particle whilst the heat treatment is being applied.

In the following, further examples are described to facilitate the understanding of the invention:

1. A method for a post process treatment of a plurality of individual expanded particles for manufacturing at least a part of a molded sporting good, in particular a midsole of a shoe, the method comprising:
  a. providing a plurality of individual expanded particles (120; 200) of a particle foam; and
  b. controlling a heat treatment to increase the density of the individual expanded particles (120; 200).
2. The method according to the preceding example, wherein the increase of the density of the individual expanded particles (120; 200) comprises shrinking the size of the individual expanded particles (120; 200).
3. The method according to the preceding example, wherein the density increases by more than 300%, preferably by more than 200%, more preferably by more than 100%, more preferably in the range of 30% to 70%.
4. The method according to any of the preceding examples, wherein the heat treatment comprises annealing the individual expanded particles (120; 200) at a temperature below the onset of melting the particles, preferably in the range from 0-50° C. below the onset of melting of the particles, preferably in the range from 0-30° C. below the onset of melting of the particles, preferably in the range from 0-10° C. below the onset of melting of the particles, more preferably in the range from 0-5° C. below the onset of melting of the particles.
5. The method according to any of the preceding examples, wherein the heat treatment is carried out for a duration of 0.1 minutes to 60 minutes, preferably 1 min to 60 min, preferably 5 min to 60 min, more preferably 5 min to 30 min, more preferably 10 min to 25 min.
6. The method according to any of the preceding claims, further comprising the step of cooling the individual expanded particles (120; 200) with the increased density.
7. The method according to example 6, wherein the cooling step further comprises allowing the individual expanded particles (120; 200) to cool to ambient temperature.
8. The method according to example 6 or 7, wherein the individual expanded particles (120; 200) are actively cooled.
9. The method according to any of the preceding examples, further comprising the step of molding at least a part of the sporting good, in particular a midsole for a shoe, comprising the individual expanded particles (120; 200) with the increased density.
10. The method according to example 9, wherein the step of molding at least a part of the sporting good, in particular a midsole for a shoe, comprises molding at least two sets of individual expanded particles having different densities.
11. The method according to any of the preceding examples, wherein step b. comprises applying radio frequency (230) to the plurality of individual expanded particles (120; 200).
12. The method according to any of the preceding examples, wherein the individual expanded particles (120; 200) comprise expanded thermoplastic polyurethane, eTPU.
13. Sporting good molded at least in part from a plurality of individual expanded particles, wherein the individual expanded particles comprise an increased density due to a controlled heat treatment as a post process after expanding the particles.
14. Sporting good according to the preceding example, wherein the sporting good is at least in part molded from at least two sets of individual expanded particles having different densities.
15. Sporting good according to any of the examples 13 or 14, wherein the sporting good is a sports shoe.
16. Sports shoe according to the preceding example, wherein the individual expanded particles are comprised in a sole, in particular in a midsole, of the sports shoe.
17. Sports shoe according to the preceding claim, wherein the individual expanded particles have been subjected to a post process treatment of any of the examples 1-12.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for a post process treatment of individual expanded particles for manufacturing at least a part of a molded sporting good, the method comprising:
providing individual expanded particles of a particle foam; and
controlling a heat treatment to increase the density of each of the individual expanded particles;
wherein the individual expanded particles comprise expanded thermoplastic polyurethane, expanded polyamide, expanded polyether block amide, or combinations thereof.

2. The method according to claim 1, wherein the increase of the density of the individual expanded particles comprises shrinking the size of the individual expanded particles.

3. The method according to claim 1, wherein the density increases by more than 100%.

4. The method according to claim 1, wherein the density increases from 30 to 70%.

5. The method according to claim 1, wherein the heat treatment comprises annealing the individual expanded particles at a temperature below the onset of melting the particles.

6. The heat treatment of claim 1, wherein the heat treatment comprises annealing the individual expanded particles at a temperature from 0 to 50° C. below the onset of melting the particles.

7. The method according to claim 1, wherein the heat treatment is carried out for a duration of 0.1 minutes to 60 minutes.

8. The method according to claim 1, further comprising the step of cooling the individual expanded particles with the increased density.

9. The method according to claim 8, wherein the cooling step further comprises allowing the individual expanded particles to cool to ambient temperature.

10. The method according to claim 8, wherein the individual expanded particles are actively cooled.

11. The method according to claim 1, further comprising the step of molding at least a part of the sporting good comprising the individual expanded particles with the increased density.

12. The method according to claim 11, wherein the step of molding at least a part of the sporting good comprises molding at least two sets of individual expanded particles having different densities.

13. The method according to claim 1, wherein the controlling a heat treatment to increase the density of each of the individual expanded particles comprises applying radio frequency to the individual expanded particles.

14. The method according to claim 1, wherein the individual expanded particles comprise expanded thermoplastic polyurethane, eTPU.

* * * * *